(12) United States Patent
Larsen et al.

(10) Patent No.: US 11,624,350 B2
(45) Date of Patent: Apr. 11, 2023

(54) SYSTEM AND METHOD FOR PROVIDING GRID-FORMING CONTROL OF AN INVERTER-BASED RESOURCE

(71) Applicant: General Electric Company, Schenectady, NY (US)

(72) Inventors: Einar Vaughn Larsen, Ballston Lake, NY (US); Dustin Howard, Atlanta, GA (US)

(73) Assignee: General Electric Company, Schenectady, NY (US)

(*) Notice: Subject to any disclaimer, the term of this patent is extended or adjusted under 35 U.S.C. 154(b) by 72 days.

(21) Appl. No.: 17/024,748

(22) Filed: Sep. 18, 2020

(65) Prior Publication Data

US 2022/0090578 A1     Mar. 24, 2022

(51) Int. Cl.
| | | |
|---|---|---|
| F03D 9/25 | (2016.01) | |
| H02J 3/38 | (2006.01) | |
| F03D 7/04 | (2006.01) | |

(52) U.S. Cl.
CPC ............. *F03D 9/257* (2017.02); *F03D 7/048* (2013.01); *H02J 3/381* (2013.01); *F05B 2270/337* (2013.01); *H02J 2300/28* (2020.01)

(58) Field of Classification Search
CPC .......... F03D 9/257; F03D 7/048; H02J 3/381; H02J 2300/28; F05B 2270/337
See application file for complete search history.

(56) References Cited

U.S. PATENT DOCUMENTS

| | | |
|---|---|---|
| 5,798,633 A | 8/1998 | Larsen et al. |
| 7,119,452 B2 | 10/2006 | Larsen |

(Continued)

FOREIGN PATENT DOCUMENTS

| | | |
|---|---|---|
| CN | 109494709 A | 3/2019 |
| EP | 2523298 B1 | 11/2012 |

(Continued)

OTHER PUBLICATIONS

Miller et al., Design and commissioning of a 5 MVA, 2.5 MWh battery energy storage system, Proceedings of 1996 Transmission and Distribution Conference and Exposition, Los Angeles CA, 1996, pp. 339-345. doi: 10.1109/TDC.1996.545957.

(Continued)

*Primary Examiner* — Joseph Ortega
(74) *Attorney, Agent, or Firm* — Armstrong Teasdale LLP

(57) ABSTRACT

A method for providing grid-forming control of an inverter-based resource includes receiving, via a controller, one or more reference commands from an external controller. The method also includes determining, via the controller, one or more control commands for the inverter-based resource based on the one or more reference commands. Further, the method includes determining, via the controller, at least one feedforward signal as a function of the one or more control commands, one or more control signals, and one or more estimated electrical conditions of the inverter-based resource. The method also includes using the feedforward signal(s) to position at least one control angle of the inverter-based resource to an anticipated value needed to achieve the one or more reference commands, thereby enabling rapid response to the one or more reference commands received from the external controller.

20 Claims, 11 Drawing Sheets

(56) References Cited

U.S. PATENT DOCUMENTS

| | | |
|---|---|---|
| 7,804,184 B2 | 9/2010 | Yuan et al. |
| 9,270,194 B2 | 2/2016 | Brogan et al. |
| 9,660,452 B2 | 5/2017 | Routimo |
| 9,660,453 B2 | 5/2017 | Majumder |
| 10,156,225 B2 | 12/2018 | Huang et al. |
| 10,305,283 B1 * | 5/2019 | Larsen .................. H02J 3/18 |
| 2010/0142237 A1 | 6/2010 | Yuan et al. |

FOREIGN PATENT DOCUMENTS

| | | |
|---|---|---|
| WO | WO2015131958 A1 | 9/2015 |
| WO | 2019164792 A1 | 8/2019 |

OTHER PUBLICATIONS

International Search Report and Written Opinion, PCT/US2021/056649, dated Feb. 14, 2022, 13 pages.

Golestan Saeed et al: "Three-Phase PLLs: A Review of Recent Advances", IEEE Transactions on Power Electronics, Institute of Electrical and Electronics Engineers, USA, vol. 32, No. 3, May 10, 2016 (May 10, 2016), pp. 1894-1907, XP011636466, ISSN: 0885-8993, DOI: 10.1109/TPEL.2016.2565642.

Wang Xiongfei et al: "Grid-Synchronization Stability of Converter-Based Resources—An Overview", IEEE Open Journal of Industry Applications, IEEE, vol. 1, Aug. 31, 2020 (Aug. 31, 2020), pp. 115-134, XP011810684, DOI: 10.1109/OJIA.2020.3020392.

* cited by examiner

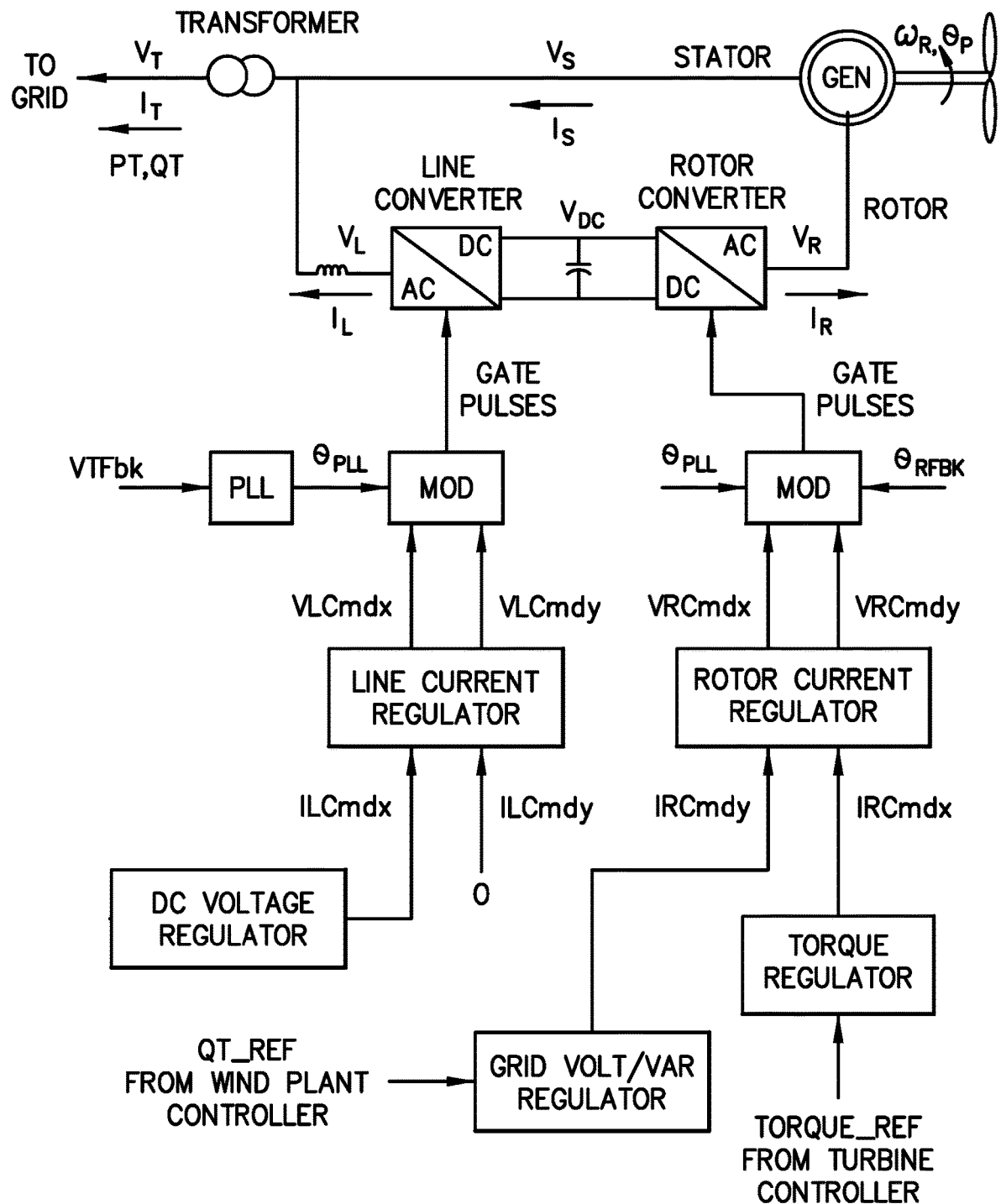
FIG. -1-
PRIOR ART

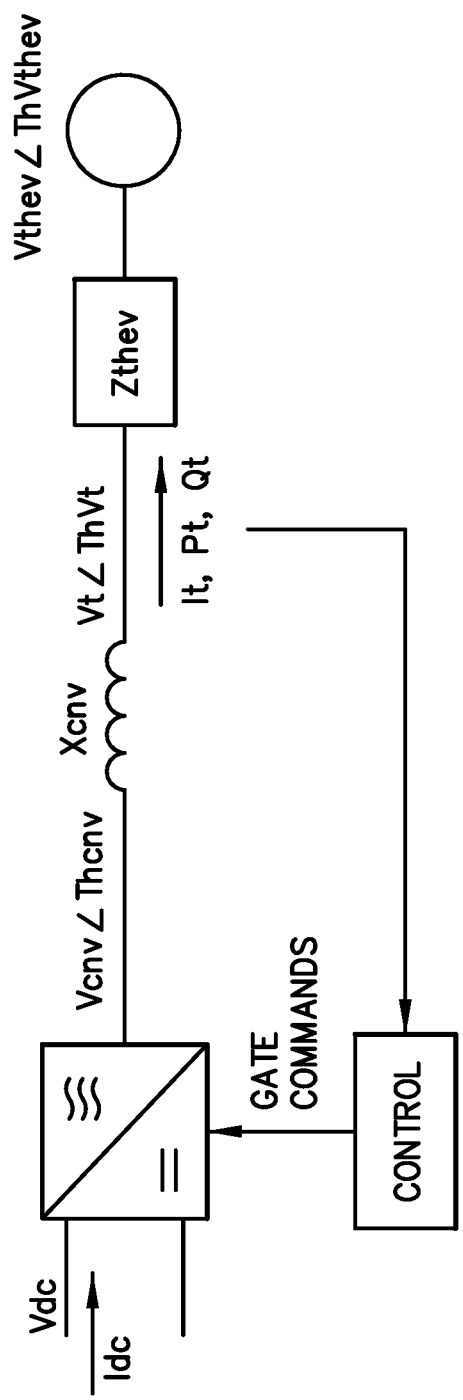
FIG. -2-
PRIOR ART

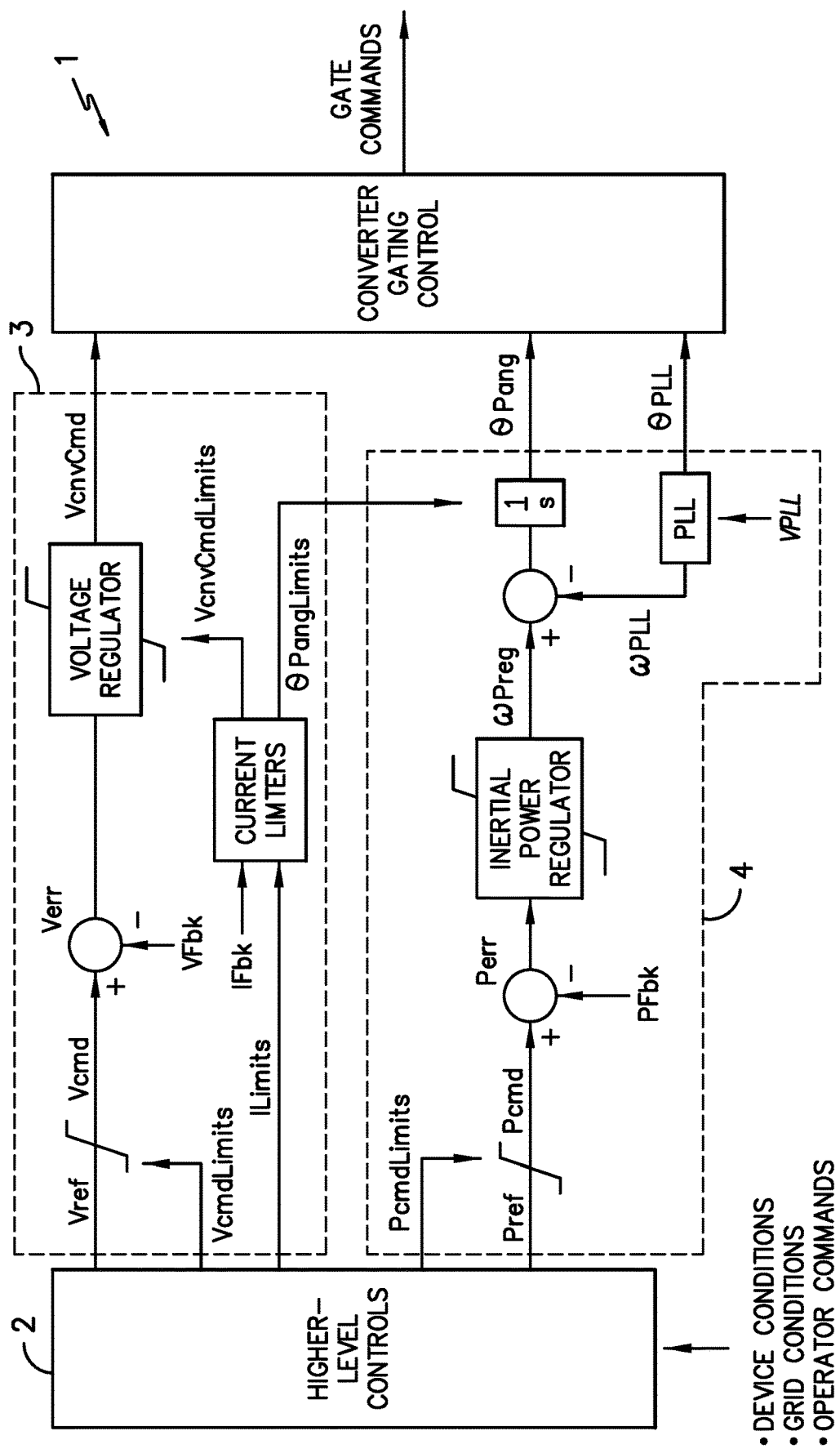
FIG. -3-

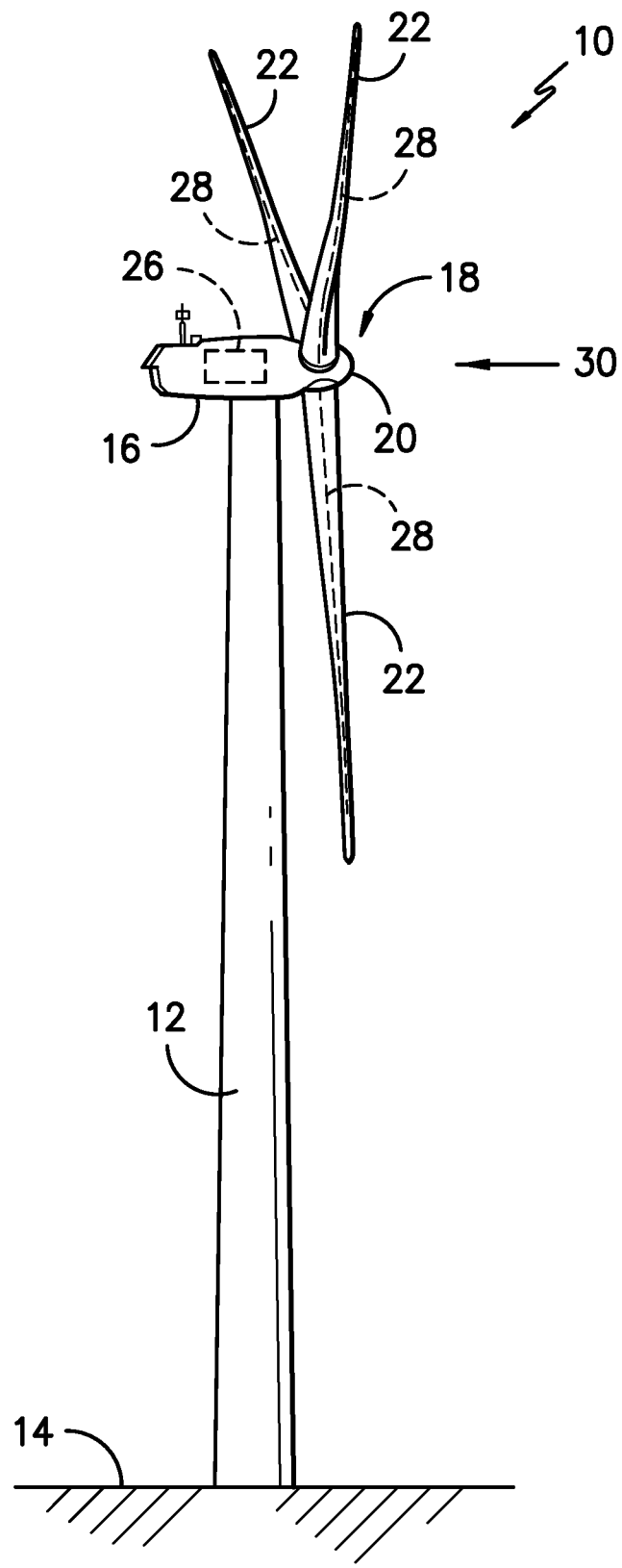
FIG. -4-

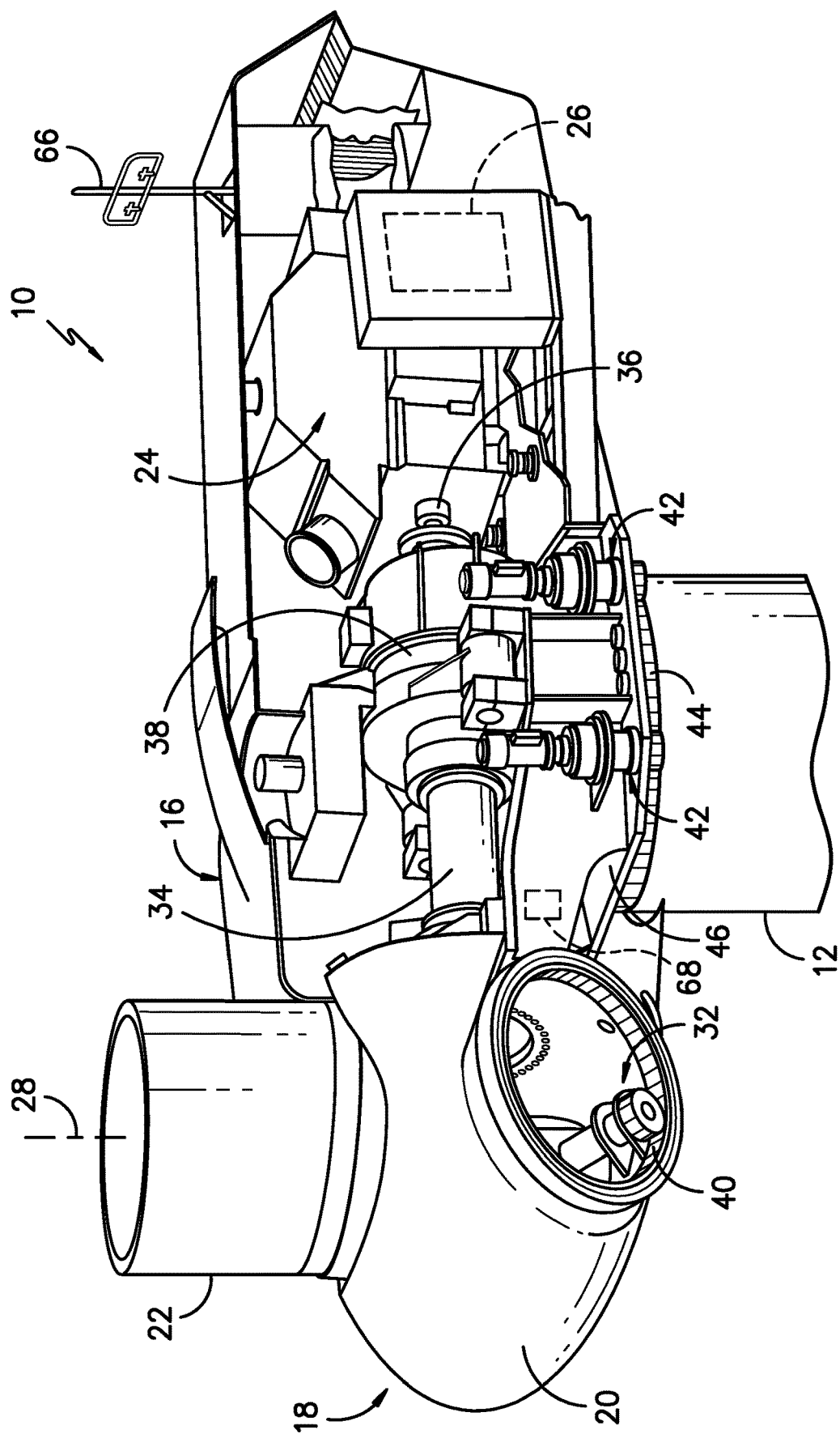
FIG. -5-

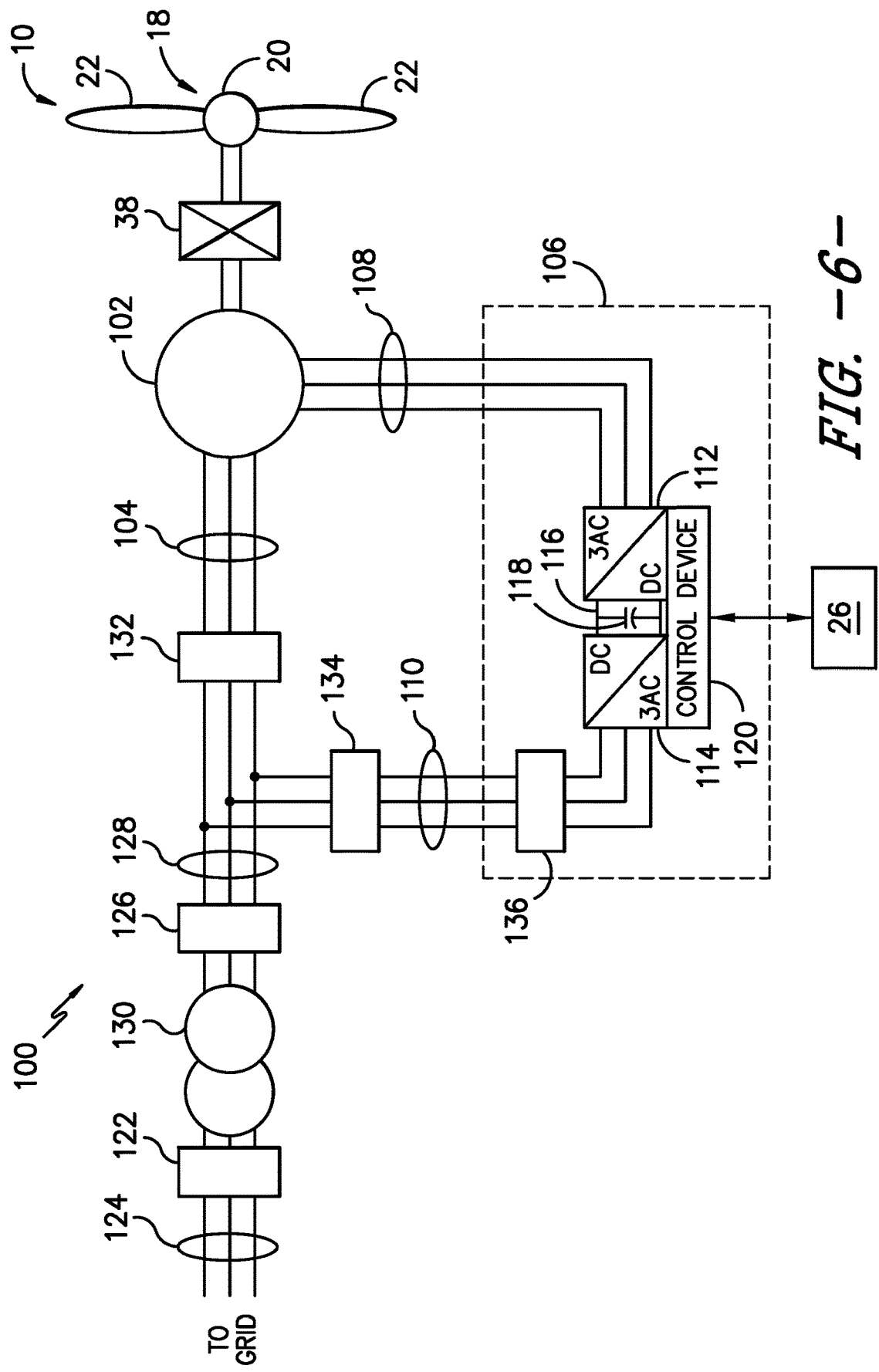
FIG. -6-

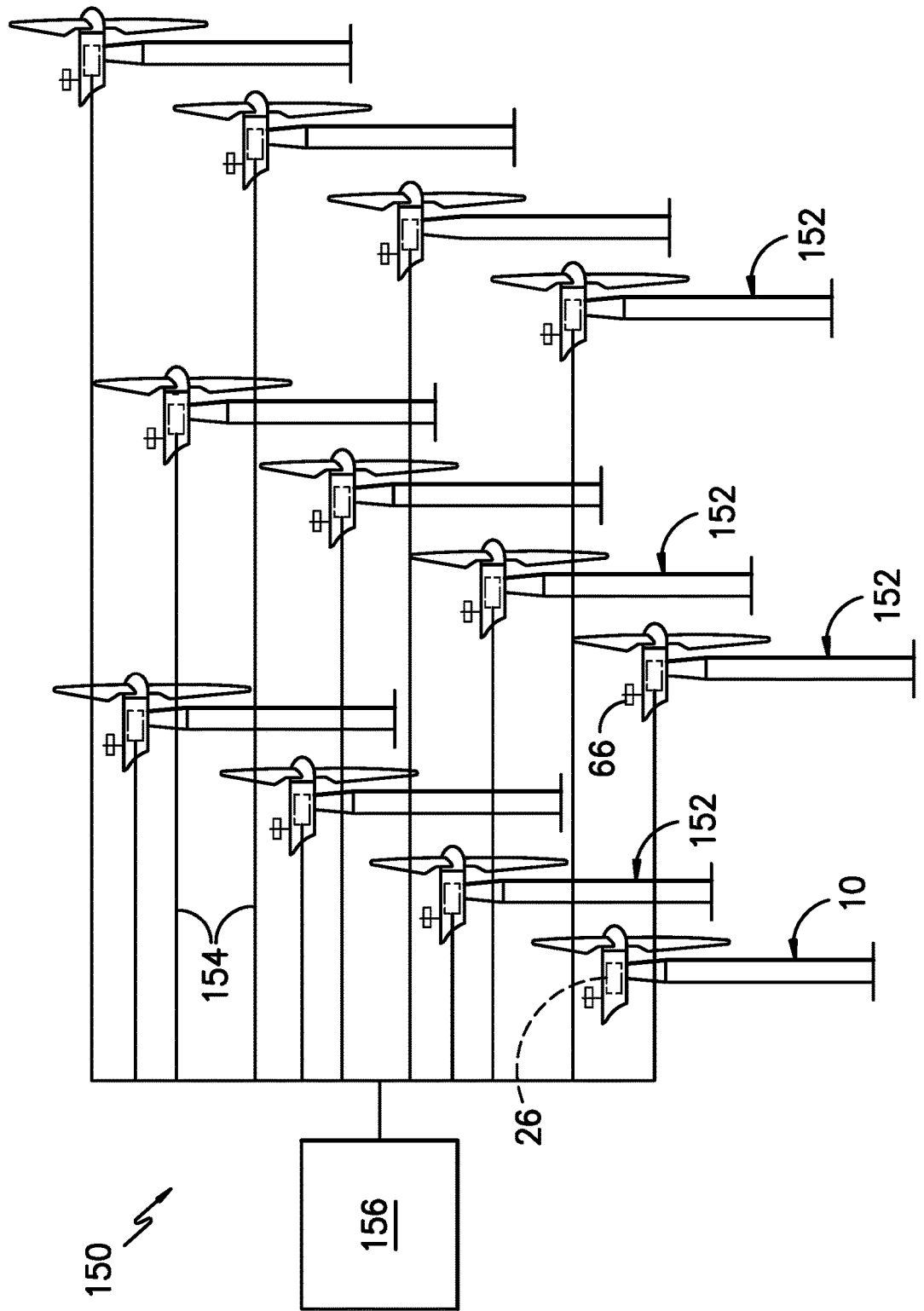

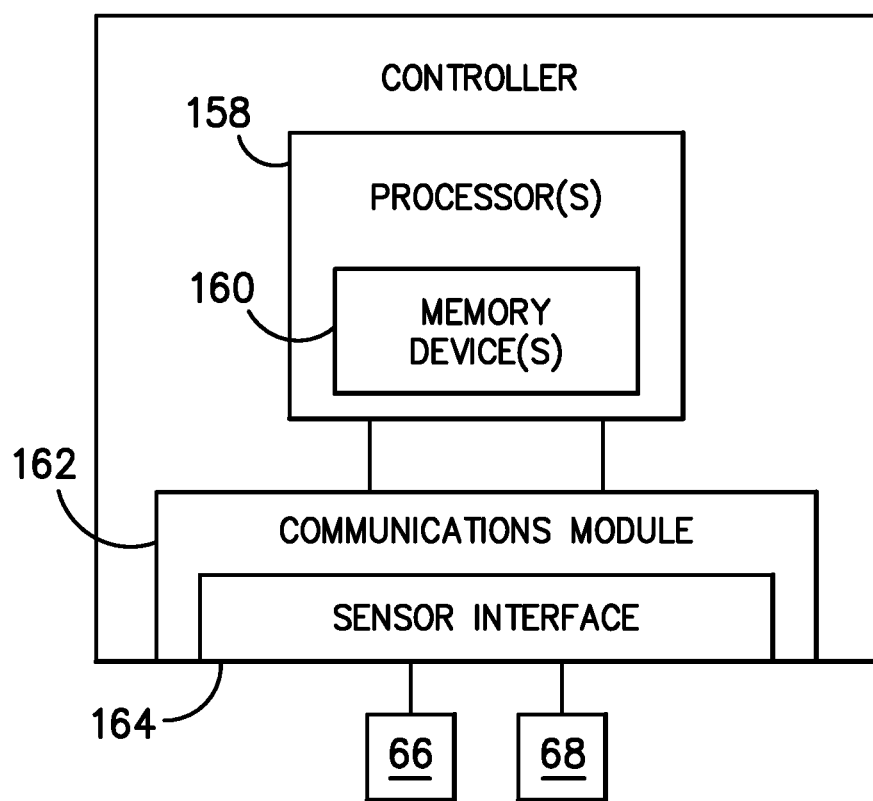
FIG. -8-

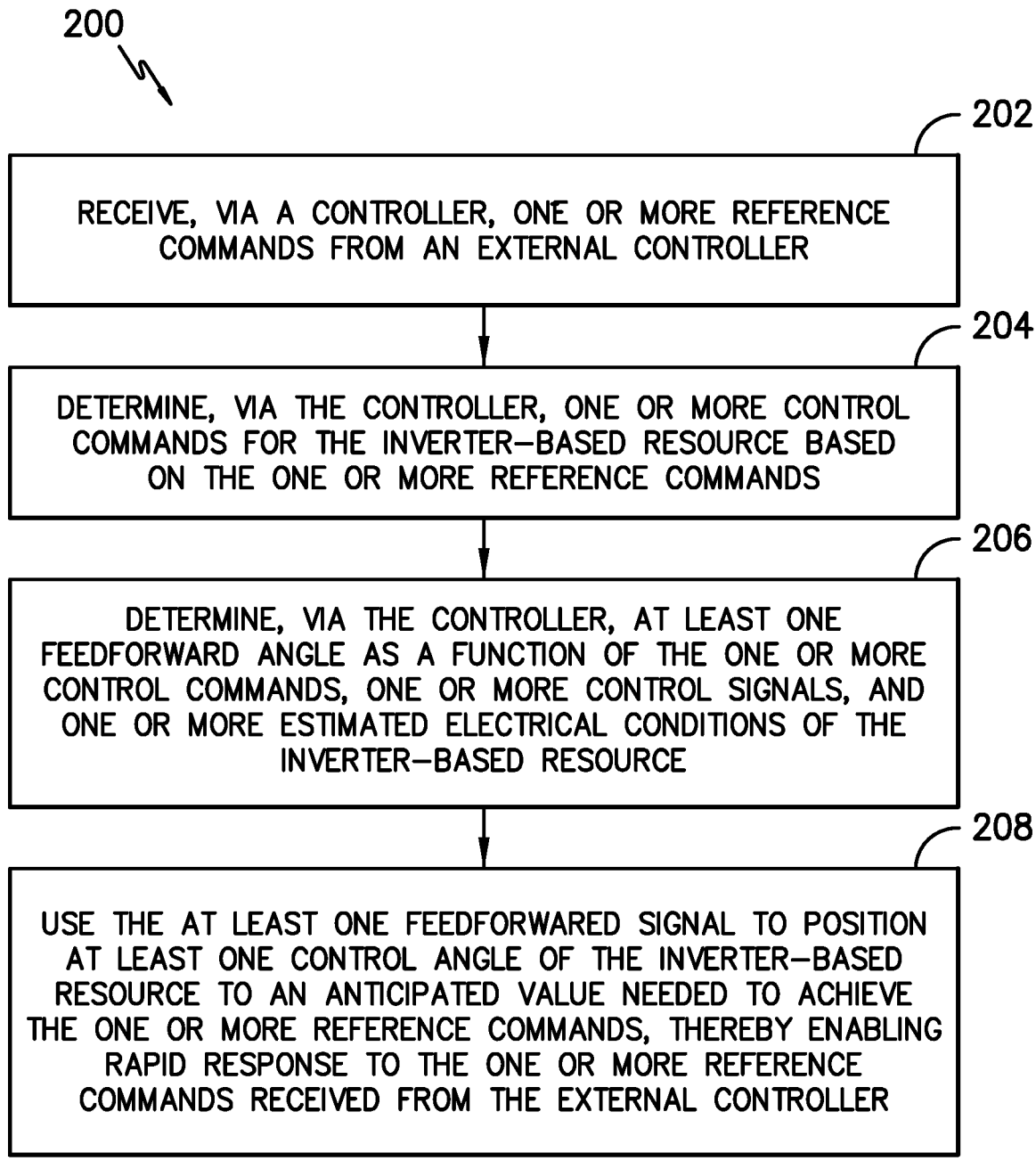
FIG. -9-

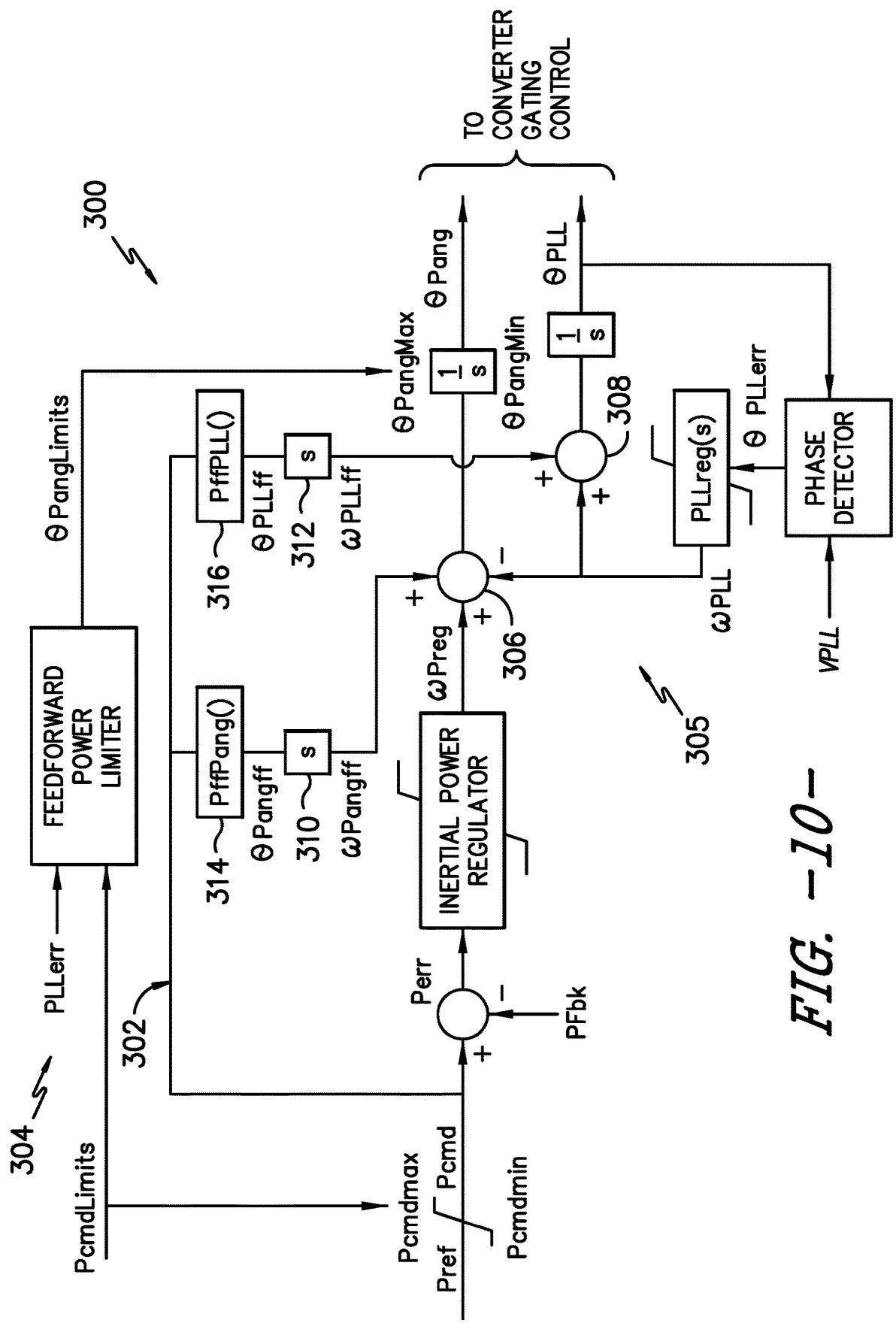
FIG. -10-

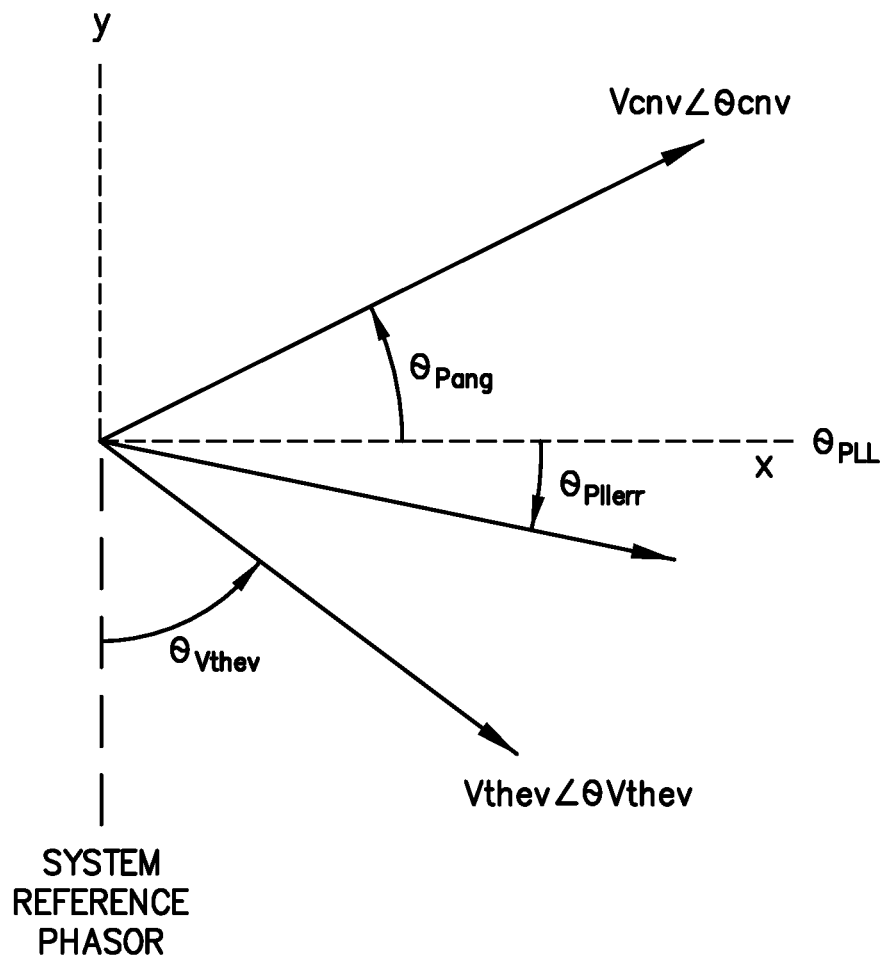
FIG. -11-

SYSTEM AND METHOD FOR PROVIDING GRID-FORMING CONTROL OF AN INVERTER-BASED RESOURCE

FIELD

The present disclosure relates generally to inverter-based resources, such as wind turbine power systems and, more particularly, to systems and methods for providing grid-forming control for inverter-based resources.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is typically geared to a generator for producing electricity.

Wind turbines can be distinguished in two types: fixed speed and variable speed turbines. Conventionally, variable speed wind turbines are controlled as current sources connected to a power grid. In other words, the variable speed wind turbines rely on a grid frequency detected by a phase locked loop (PLL) as a reference and inject a specified amount of current into the grid. The conventional current source control of the wind turbines is based on the assumptions that the grid voltage waveforms are fundamental voltage waveforms with fixed frequency and magnitude and that the penetration of wind power into the grid is low enough so as to not cause disturbances to the grid voltage magnitude and frequency. Thus, the wind turbines simply inject the specified current into the grid based on the fundamental voltage waveforms. However, with the rapid growth of the wind power, wind power penetration into some grids has increased to the point where wind turbine generators have a significant impact on the grid voltage and frequency. When wind turbines are located in a weak grid, wind turbine power fluctuations may lead to an increase in magnitude and frequency variations in the grid voltage. These fluctuations may adversely affect the performance and stability of the PLL and wind turbine current control.

Many existing renewable generation converters, such as double-fed wind turbine generators, operate in a "grid-following" mode. Grid-following type devices utilize fast current-regulation loops to control active and reactive power exchanged with the grid. More specifically, FIG. 1 illustrates the basic elements of the main circuit and converter control structure for a grid-following double-fed wind turbine generator. As shown, the active power reference to the converter is developed by the energy source regulator, e.g. the turbine control portion of a wind turbine. This is conveyed as a torque reference which represents the lesser of the maximum attainable power from the energy source at that instant, or a curtailment command from a higher-level grid controller. The converter control then determines a current reference for the active component of current to achieve the desired torque. Accordingly, the double-fed wind turbine generator includes functions that manage the voltage and reactive power in a manner that results in a command for the reactive component of current. Wide-bandwidth current regulators then develop commands for voltage to be applied by the converters to the system, such that the actual currents closely track the commands.

Alternatively, grid-forming type converters provide a voltage-source characteristic, where the angle and magnitude of the voltage are controlled to achieve the regulation functions needed by the grid. With this structure, current will flow according to the demands of the grid while the converter contributes to establishing a voltage and frequency for the grid. This characteristic is comparable to conventional generators based on a turbine driving a synchronous machine. Thus, a grid-forming source must include the following basic functions: (1) support grid voltage and frequency for any current flow within the rating of the equipment, both real and reactive; (2) prevent operation beyond equipment voltage or current capability by allowing grid voltage or frequency to change rather than disconnecting equipment (disconnection is allowed only when voltage or frequency are outside of bounds established by the grid entity); (3) remain stable for any grid configuration or load characteristic, including serving an isolated load or connected with other grid-forming sources, and switching between such configurations; (4) share total load of the grid among other grid-forming sources connected to the grid; (5) ride through grid disturbances, both major and minor, and (6) meet requirements (1)-(5) without requiring fast communication with other control systems existing in the grid, or externally-created logic signals related to grid configuration changes.

The basic control structure to achieve the above grid-forming objectives was developed and field-proven for battery systems in the early 1990's (see e.g., U.S. Pat. No. 5,798,633 entitled "Battery Energy Storage Power Conditioning System"). Applications to full-converter wind generators and solar generators are disclosed in U.S. Pat. No. 7,804,184 entitled "System and Method for Control of a Grid Connected Power Generating System," and U.S. Pat. No. 9,270,194 entitled "Controller for controlling a power converter." Applications to grid-forming control for a doubly-fed wind turbine generator are disclosed in PCT/US2020/013787 entitled "System and Method for Providing Grid-Forming Control for a Doubly-Feb Wind Turbine Generator."

As an example, FIG. 2 illustrates a schematic diagram of one embodiment of a main circuit of a grid-forming system. As shown, the main circuit includes a power-electronic converter with connections on DC and AC sides. This converter receives gating commands from a controller that creates an AC voltage phasor Vcnv at an angle of Thvcnv. The angle is with respect to a reference phasor having a fixed frequency. The DC side is supplied with a device capable of generating or absorbing power for even a short duration. Such devices may include, for example, batteries, solar panels, rotating machines with a rectifier, or capacitors. In addition, as shown, the circuit includes an inductive impedance Xcnv connecting the converter to its point of interconnection, shown as the voltage Vt and angle ThVt in FIG. 2. The electrical system behind the point of interconnect is shown as a Thevenin equivalent with impedance Zthev and voltage Vthev at angle ThVthev. This equivalent can be used to represent any circuit, including grid-connected and islanded circuits with loads. In practical situations, the impedance Zthev will be primarily inductive.

Still referring to FIG. 2, the closed-loop portion of the main control receives feedback signals from the voltage and current at the point of interconnection. Additional inputs are received from higher-level controls (not shown). While FIG. 2 illustrates a single converter as an example, any grouping of equipment that can create an electrical equivalent of a controlled voltage Vcnv behind an impedance Xcnv can have the control schemes disclosed applied to achieve the same performance benefits.

Referring now to FIG. 3, a control diagram for providing grid-forming control according to conventional construction is illustrated. As shown, a converter controller 1 receives references (e.g. Vref and Pref) and limits (e.g. VcmdLimits and PcmdLimits) from higher-level controls 2. These high-level limits are on physical quantities of voltage, current, and power. The main regulators include a fast voltage regulator 3 and a slow power regulator 4. These regulators 3, 4 have final limits applied to the converter control commands for voltage magnitude (e.g. VcnvCmd) and angle (e.g. $\theta_{Pang}$ and $\theta_{PLL}$) to implement constraints on reactive- and real-components of current, respectively. Further, such limits are based upon a pre-determined fixed value as a default, with closed-loop control to reduce the limits should current exceed limits.

To be effective, grid-forming resources must be able to maintain an internal voltage phasor that does not move quickly when there are changes in grid conditions, e.g. sudden addition/removal of loads, opening or closing of grid connections that lead to phase jumps and/or rapid change of frequency. In other words, the power from the grid-forming resource must be able to change suddenly to stabilize the grid, with a subsequent slow reset to power being commanded from a higher-level control function. In addition, the grid forming resource must be able to rapidly enforce power limits that exist due to constraints on the power-handling portions of the device, e.g. DC voltages/currents in a battery, solar array, and/or wind generating system. Such a response is needed for severe disturbances on the grid, e.g. faults where power limits will be dynamically adjusted to coordinate with grid conditions for secure recovery from the fault. Further, the grid forming resource should be able to rapidly follow changes in commands from higher-level controls, e.g. for damping mechanical vibrations in a wind turbine. Such requirements, however, can be difficult to achieve.

In view of the foregoing, an improved system and method that addresses the aforementioned issues would be welcomed in the art. Accordingly, the present disclosure is directed to a system and method for controlling an inverter-based resource that provides improved grid-forming control in response to sudden changes in the grid, while also being able to rapidly limit power to stay within equipment ratings and to rapidly follow commands from higher-level controls.

BRIEF DESCRIPTION

Aspects and advantages of the invention will be set forth in part in the following description, or may be obvious from the description, or may be learned through practice of the invention.

In one aspect, the present disclosure is directed to a method for providing grid-forming control of an inverter-based resource. The method includes receiving, via a controller, one or more reference commands from an external controller. The method also includes determining, via the controller, one or more control commands for the inverter-based resource based on the one or more reference commands. Further, the method includes determining, via the controller, at least one feedforward signal as a function of the one or more control commands, one or more control signals, and one or more estimated electrical conditions of the inverter-based resource. The method also includes using the at least one feedforward signal to position at least one control angle of the inverter-based resource to an anticipated value needed to achieve the one or more reference commands, thereby enabling rapid response to the one or more reference commands received from the external controller.

In an embodiment, the feedforward signal may include an angle or angle rate of change.

In another embodiment, determining the feedforward signal(s) may include determining, via the controller, a feedforward power angle as a function of the one or more control commands, the one or more control signals, and one or more first electrical conditions of the inverter-based resource and determining, via the controller, a feedforward phase-locked loop angle for a phase-locked loop of the controller as a function of the one or more control commands, the one or more control signals, and one or more second electrical conditions of the inverter-based resource.

In such embodiments, the first electrical conditions of the inverter-based resource may include a converter impedance or a terminal voltage. Further, in certain embodiments, the second electrical condition(s) of the inverter-based resource may include at least one of a terminal voltage, a feedforward impedance, or a feedforward voltage.

In further embodiments, using the feedforward signal(s) to position the control angle(s) of the inverter-based resource to the anticipated value needed to achieve the one or more reference commands may include determining, via the controller, a power angle rate of change and a phase-locked loop angle rate of change as a function of the feedforward power angle and the feedforward phase-locked loop angle, respectively. In such embodiments, determining the power angle rate of change and the phase-locked loop angle rate of change as a function of the feedforward power angle and the feedforward phase-locked loop angle, respectively, may include adding a feedforward power angle rate of change and a feedforward phase-locked angle rate of change to a power regulator frequency and a phase-locked loop frequency, respectively In additional embodiments, determining the power angle and the phase-locked loop angle as a function of the feedforward power angle and the feedforward phase-locked loop angle, respectively, may include, for example, differentiating the feedforward power angle and the feedforward phase-locked loop angles, respectively, and adding the differentiated feedforward power angle and the differentiated feedforward phase-locked angle to the power angle and the phase-locked loop angle, respectively.

In certain embodiments, the reference command(s) may include a power reference or one or more power command limits from the external controller. Further, in an embodiment, the control command(s) may include a power command.

In another embodiment, determining the feedforward power angle as a function of the one or more control commands, the one or more control signals, and the one or more first electrical conditions of the inverter-based resource may include multiplying the power command by the converter impedance to obtain a first product, multiplying a converter voltage command by the terminal voltage to obtain a second product, dividing the first product by the second product to obtain a quotient, and determining the arcsine of the quotient.

In further embodiments, determining the feedforward phase-locked loop angle for the phase-locked loop of the controller as a function of the one or more control commands, the one or more control signals, and the one or more second electrical conditions of the inverter-based resource may include multiplying the power command by the feedforward impedance to obtain a first product, multiplying the feedforward voltage by the terminal voltage to obtain a second product, dividing the first product by the second product to obtain a quotient, and determining the arcsine of the quotient.

In particular embodiments, the method may include estimating the feedforward impedance as a central impedance value between a strongest system and a weak system.

In yet another embodiment, the method may include dynamically estimating the feedforward voltage as a function of at least one of real power, reactive power, voltage, or the feedforward impedance. In certain embodiments, the method may include setting the feedforward voltage as a fixed value.

In several embodiments, using the feedforward signal(s) to position the control angle(s) of the inverter-based resource to the anticipated value needed to achieve the one or more reference commands may include determining upper and lower power angle limits for the at least one control angle and applying the upper and lower power angle limits to the power angle to provide a constraint on power while one or more other regulators of the inverter-based resource act to settle after a transient event.

In certain embodiments, determining the upper and lower power angle limits for the control angle(s) may include multiplying each of a maximum power command and a minimum power command by the converter impedance to obtain a maximum product and a minimum product, respectively, multiplying a converter voltage command by the terminal voltage to obtain a second product, dividing each of the maximum product and the minimum product by the second product, respectively, to obtain a maximum quotient and a minimum quotient, determining the arcsine of each of the maximum quotient and the minimum quotient, and adding a phase-locked loop error to the arcsine of the maximum quotient and the arsine of the minimum quotient.

In another aspect, the present disclosure is directed to a converter controller for providing grid-forming control of an inverter-based resource. The converter controller includes at least one controller having at least one processor. The processor is configured to perform a plurality of operations, including but not limited to receiving one or more control commands, determining at least one feedforward signal as a function of the one or more control commands, one or more control signals, and one or more estimated electrical conditions of the inverter-based resource, and using the at least one feedforward signal to position at least one control angle of the inverter-based resource to an anticipated value needed to achieve the one or more reference commands, thereby enabling rapid response to the one or more reference commands received from the external controller. It should be understood that the converter controller may further include any of the additional features and/or steps described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a one-line diagram of a double-fed wind turbine generator with structure of converter controls for grid-following application according to conventional construction;

FIG. 2 illustrates a schematic diagram of one embodiment of a main circuit of a grid-forming system according to conventional construction;

FIG. 3 illustrates a control diagram for providing grid-forming control according to conventional construction;

FIG. 4 illustrates a perspective view of one embodiment of a wind turbine according to the present disclosure;

FIG. 5 illustrates a simplified, internal view of one embodiment of a nacelle according to the present disclosure;

FIG. 6 illustrates a schematic view of one embodiment of a wind turbine electrical power system suitable for use with the wind turbine shown in FIG. 1;

FIG. 7 illustrates a schematic view of one embodiment of a wind farm having a plurality of wind turbines according to the present disclosure;

FIG. 8 illustrates a block diagram of one embodiment of a controller according to the present disclosure;

FIG. 9 illustrates a flow diagram of one embodiment of method for providing grid-forming control of an inverter-based resource according to the present disclosure;

FIG. 10 illustrates a control diagram of one embodiment of system for providing grid-forming control of an inverter-based resource according to the present disclosure;

FIG. 11 illustrates a schematic view of one embodiment of a phasor diagram that depicts phasor relationships between system voltages, a phase-locked loop, and a fixed-frequency reference according to the present disclosure.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present disclosure is directed to systems and methods for providing grid-forming control via an inverter-based resource in response to sudden changes in the grid, while also being able to rapidly limit power to stay within equipment ratings and to rapidly follow commands from higher-level controls. Thus, in certain embodiments, the rapid response to control commands is achieved with a feedforward path as well as an improved power limit function. Though the systems and methods of the present disclosure are described in general herein with respect to a wind turbine power system, it should be understood that the systems and methods can be applied to any other inverter-based resource.

Referring now to the drawings, FIG. 4 illustrates a perspective view of one embodiment of a wind turbine 10 according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 5) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine 10. Further, the controller 26 may be communicatively coupled to any number of the components of the wind turbine 10 in order to control the operation of such components and/or implement a corrective or control action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes (e.g., start-up or shut-down sequences), de-rating or up-rating the wind turbine, and/or individual components of the wind turbine 10.

Referring now to FIG. 5, a simplified, internal view of one embodiment of the nacelle 16 of the wind turbine 10 shown in FIG. 4 is illustrated. As shown, a generator 24 may be disposed within the nacelle 16 and supported atop a bedplate 46. In general, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

The wind turbine 10 may also one or more pitch drive mechanisms 32 communicatively coupled to the wind turbine controller 26, with each pitch adjustment mechanism(s) 32 being configured to rotate a pitch bearing 40 and thus the individual rotor blade(s) 22 about its respective pitch axis 28. In addition, as shown, the wind turbine 10 may include one or more yaw drive mechanisms 42 configured to change the angle of the nacelle 16 relative to the wind (e.g., by engaging a yaw bearing 44 of the wind turbine 10 that is arranged between the nacelle 16 and the tower 12 of the wind turbine 10).

In addition, the wind turbine 10 may also include one or more sensors 66, 68 for monitoring various wind conditions of the wind turbine 10. For example, the incoming wind direction 52, wind speed, or any other suitable wind condition near the wind turbine 10 may be measured, such as through use of a suitable weather sensor 66. Suitable weather sensors may include, for example, Light Detection and Ranging ("LIDAR") devices, Sonic Detection and Ranging ("SODAR") devices, anemometers, wind vanes, barometers, radar devices (such as Doppler radar devices) or any other sensing device which can provide wind directional information now known or later developed in the art. Still further sensors 68 may be utilized to measure additional operating parameters of the wind turbine 10, such as voltage, current, vibration, etc. as described herein.

Referring now to FIG. 6, a schematic diagram of one embodiment of a wind turbine power system 100 is illustrated in accordance with aspects of the present disclosure. Although the present disclosure will generally be described herein with reference to the wind turbine 10 shown in FIG. 4, those of ordinary skill in the art, using the disclosures provided herein, should understand that aspects of the present disclosure may also be applicable in other power generation systems, and, as mentioned above, that the invention is not limited to wind turbine systems.

In the embodiment of FIG. 6 and as mentioned, the rotor 18 of the wind turbine 10 (FIG. 4) may, optionally, be coupled to the gearbox 38, which is, in turn, coupled to a generator 102, which may be a doubly fed induction generator (DFIG). As shown, the DFIG 102 may be connected to a stator bus 104. Further, as shown, a power converter 106 may be connected to the DFIG 102 via a rotor bus 108, and to the stator bus 104 via a line side bus 110. As such, the stator bus 104 may provide an output multiphase power (e.g. three-phase power) from a stator of the DFIG 102, and the rotor bus 108 may provide an output multiphase power (e.g. three-phase power) from a rotor of the DFIG 102. The power converter 106 may also include a rotor side converter (RSC) 112 and a line side converter (LSC) 114. The DFIG 102 is coupled via the rotor bus 108 to the rotor side converter 112. Additionally, the RSC 112 is coupled to the LSC 114 via a DC link 116 across which is a DC link capacitor 118. The LSC 114 is, in turn, coupled to the line side bus 110.

The RSC 112 and the LSC 114 may be configured for normal operating mode in a three-phase, pulse width modulation (PWM) arrangement using one or more switching devices, such as insulated gate bipolar transistor (IGBT) switching elements. In addition, the power converter 106 may be coupled to a converter controller 120 in order to control the operation of the rotor side converter 112 and/or the line side converter 114 as described herein. It should be noted that the converter controller 120 may be configured as an interface between the power converter 106 and the turbine controller 26 and may include any number of control devices.

In typical configurations, various line contactors and circuit breakers including, for example, a grid breaker 122 may also be included for isolating the various components as necessary for normal operation of the DFIG 102 during connection to and disconnection from a load, such as the electrical grid 124. For example, a system circuit breaker 126 may couple a system bus 128 to a transformer 130, which may be coupled to the electrical grid 124 via the grid breaker 122. In alternative embodiments, fuses may replace some or all of the circuit breakers.

In operation, alternating current power generated at the DFIG 102 by rotating the rotor 18 is provided to the electrical grid 124 via dual paths defined by the stator bus 104 and the rotor bus 108. On the rotor bus side 108, sinusoidal multi-phase (e.g. three-phase) alternating current (AC) power is provided to the power converter 106. The rotor side power converter 112 converts the AC power provided from the rotor bus 108 into direct current (DC) power and provides the DC power to the DC link 116. As is generally understood, switching elements (e.g. IGBTs) used in the bridge circuits of the rotor side power converter 112 may be modulated to convert the AC power provided from the rotor bus 108 into DC power suitable for the DC link 116.

In addition, the line side converter 114 converts the DC power on the DC link 116 into AC output power suitable for the electrical grid 124. In particular, switching elements (e.g. IGBTs) used in bridge circuits of the line side power converter 114 can be modulated to convert the DC power on the DC link 116 into AC power on the line side bus 110. The AC power from the power converter 106 can be combined with the power from the stator of DFIG 102 to provide multi-phase power (e.g. three-phase power) having a frequency maintained substantially at the frequency of the electrical grid 124 (e.g. 50 Hz or 60 Hz).

Additionally, various circuit breakers and switches, such as grid breaker 122, system breaker 126, stator sync switch 132, converter breaker 134, and line contactor 136 may be included in the wind turbine power system 100 to connect or disconnect corresponding buses, for example, when current flow is excessive and may damage components of the wind turbine power system 100 or for other operational considerations. Additional protection components may also be included in the wind turbine power system 100.

Moreover, the power converter 106 may receive control signals from, for instance, the local control system 176 via the converter controller 120. The control signals may be based, among other things, on sensed states or operating characteristics of the wind turbine power system 100. Typically, the control signals provide for control of the operation of the power converter 106. For example, feedback in the form of a sensed speed of the DFIG 102 may be used to control the conversion of the output power from the rotor bus 108 to maintain a proper and balanced multi-phase (e.g. three-phase) power supply. Other feedback from other sensors may also be used by the controller(s) 120, 26 to control the power converter 106, including, for example, stator and rotor bus voltages and current feedbacks. Using the various forms of feedback information, switching control signals (e.g. gate timing commands for IGBTs), stator synchronizing control signals, and circuit breaker signals may be generated.

The power converter 106 also compensates or adjusts the frequency of the three-phase power from the rotor for changes, for example, in the wind speed at the hub 20 and the rotor blades 22. Therefore, mechanical and electrical rotor frequencies are decoupled and the electrical stator and rotor frequency matching is facilitated substantially independently of the mechanical rotor speed.

Under some states, the bi-directional characteristics of the power converter 106, and specifically, the bi-directional characteristics of the LSC 114 and RSC 112, facilitate feeding back at least some of the generated electrical power into generator rotor. More specifically, electrical power may be transmitted from the stator bus 104 to the line side bus 110 and subsequently through the line contactor 136 and into the power converter 106, specifically the LSC 114 which acts as a rectifier and rectifies the sinusoidal, three-phase AC power to DC power. The DC power is transmitted into the DC link 116. The capacitor 118 facilitates mitigating DC link voltage amplitude variations by facilitating mitigation of a DC ripple sometimes associated with three-phase AC rectification.

The DC power is subsequently transmitted to the RSC 112 that converts the DC electrical power to a three-phase, sinusoidal AC electrical power by adjusting voltages, currents, and frequencies. This conversion is monitored and controlled via the converter controller 120. The converted AC power is transmitted from the RSC 112 via the rotor bus 108 to the generator rotor. In this manner, generator reactive power control is facilitated by controlling rotor current and voltage.

Referring now to FIG. 7, the wind turbine power system 100 described herein may be part of a wind farm 50. As shown, the wind farm 50 may include a plurality of wind turbines 52, including the wind turbine 10 described above, and an overall farm-level controller 56. For example, as shown in the illustrated embodiment, the wind farm 50 includes twelve wind turbines, including wind turbine 10. However, in other embodiments, the wind farm 50 may include any other number of wind turbines, such as less than twelve wind turbines or greater than twelve wind turbines. In one embodiment, the turbine controllers of the plurality of wind turbines 52 are communicatively coupled to the farm-level controller 56, e.g. through a wired connection, such as by connecting the turbine controller 26 through suitable communicative links 54 (e.g., a suitable cable). Alternatively, the turbine controllers may be communicatively coupled to the farm-level controller 56 through a wireless connection, such as by using any suitable wireless communications protocol known in the art. In further embodiments, the farm-level controller 56 is configured to send and receive control signals to and from the various wind turbines 52, such as for example, distributing real and/or reactive power demands across the wind turbines 52 of the wind farm 50.

Referring now to FIG. 8, a block diagram of one embodiment of suitable components that may be included within the controller (such as any one of the converter controller 120, the turbine controller 26, and/or the farm-level controller 56 described herein) in accordance with example aspects of the present disclosure is illustrated. As shown, the controller may include one or more processor(s) 58, computer, or other suitable processing unit and associated memory device(s) 60 that may include suitable computer-readable instructions that, when implemented, configure the controller to perform various different functions, such as receiving, transmitting and/or executing wind turbine control signals (e.g., performing the methods, steps, calculations and the like disclosed herein).

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 60 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements.

Such memory device(s) 60 may generally be configured to store suitable computer-readable instructions that, when implemented by the processor(s) 58, configure the controller to perform various functions as described herein. Additionally, the controller may also include a communications interface 62 to facilitate communications between the controller and the various components of the wind turbine 10. An interface can include one or more circuits, terminals, pins, contacts, conductors, or other components for sending and receiving control signals. Moreover, the controller may include a sensor interface 64 (e.g., one or more analog-todigital converters) to permit signals transmitted from the sensors 66, 68 to be converted into signals that can be understood and processed by the processor(s) 58.

Referring now to FIG. 9, a flow diagram of one embodiment of a method 200 for providing grid-forming control of an inverter-based resource is provided. In general, the method 200 is described herein with reference to the wind turbine power system 100 of FIGS. 4-8. However, it should be appreciated that the disclosed method 200 may be implemented with any other suitable power generation systems having any other suitable configurations. In addition, although FIG. 9 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (202), the method 200 includes receiving, via a controller, one or more reference commands from an external controller. As shown at (204), the method 200 includes determining, via the controller, one or more control commands for the inverter-based resource based on the one or more reference commands. For example, in an embodiment, the reference command(s) may include a power reference from an external controller. Accordingly, the control command(s) may include a power command.

As shown at (206), the method 200 includes determining, via the controller, at least one feedforward signal as a function of the one or more control commands, one or more control signals, and one or more estimated electrical conditions of the inverter-based resource. In such embodiments, the feedforward signal(s) may include an angle or an angle rate of change. For example, in an embodiment, determining the feedforward signal(s) may include determining, via the controller, a feedforward power angle as a function of the control command(s), the control signal(s), and one or more first electrical conditions of the inverter-based resource. In such embodiments, the first electrical conditions of the inverter-based resource may include, for example, a converter impedance and/or a terminal voltage.

In additional embodiments, determining the feedforward signal(s) may include determining, via the controller, a feedforward phase-locked loop angle for a phase-locked loop of the controller as a function of the control command(s), the control signal(s), and one or more second electrical conditions of the inverter-based resource. In such embodiments, for example, the second electrical condition(s) of the inverter-based resource may include a terminal voltage, a feedforward impedance, and/or a feedforward voltage.

Still referring to FIG. 9, as shown at (208), the method 200 includes using the feedforward signal(s) to position at least one control angle of the inverter-based resource to an anticipated value needed to achieve the one or more reference commands, thereby enabling rapid response to the one or more reference commands received from the external controller. For example, in an embodiment, using the feedforward signal(s) to position the control angle(s) of the inverter-based resource to the anticipated value needed to achieve the one or more reference commands may include determining, via the controller, a power angle and a phase-locked loop angle as a function of the feedforward power angle and the feedforward phase-locked loop angle, respectively.

The method 200 of FIG. 9 can now be better understood with reference to the system 300 illustrated in FIG. 10. In particular, FIG. 10 illustrates a control diagram of one embodiment of the system 300 for providing grid-forming control of an inverter-based resource. As shown, the system 300 may include many of the same features of FIG. 3 described herein. More specifically, as shown, FIG. 10 illustrates a unique power regulator structure (as compared to the convention power regulator 4 of FIG. 3) that includes grid-forming power feedforward control according to the present disclosure. As shown, the converter controller 120 receives a power reference Pref and a power command limits PcmdLimits from a higher-level controller (e.g. the turbine controller 26 and/or the farm-level controller 156). These high-level limits are on physical quantities of voltage, current, and power. Thus, as shown, the power regulator has final limits applied to the converter control commands for power angle (e.g. $\theta_{Pang}$) to implement constraints on real-components of current, respectively. In particular, as shown in FIG. 10, the system 300 of the present disclosure provides rapid response to control commands using a feedforward path 302 and an improved power limit function 304.

More specifically, as shown in FIG. 11, a phasor diagram according to one embodiment of the present disclosure is provided that defines the phasor relationships between the system voltages, the phase-locked loop (PLL) 305, and the fixed-frequency reference. Accordingly, power flow is a function of the converter angle relative to the remote equivalent and the impedances of the system 300, as well as voltage amplitudes. In one embodiment, as an example, resistances are assumed to be negligible for clarity. Thus, for the conventional grid forming circuit shown in FIG. 2, as well as the unique grid forming power regulator of FIG. 10, the following physical relationships exist:

$$P = Vcnv * Vthev * \sin(\theta_{Vcnv} - \theta_{Vthev})/(Xcnv + Xthev) \quad \text{Equation (1)}$$

$$P = Vt * Vthev * \sin(\theta_{Vt} - \theta_{Vthev})/(Xthev) \quad \text{Equation (2)}$$

$$P = Vcnv * Vt * \sin(\theta_{Vcnv} - \theta_{Vt})/(Xcnv) \quad \text{Equation (3)}$$

Where P is the power,
Vcnv is the converter voltage,
Vthev is the Thevenin equivalent voltage,
Vt is the terminal voltage,
$\theta_{Vcnv}$ is the angle of the converter voltage;
$\theta_{Vthev}$ is the angle of the Thevenin equivalent voltage,
$\theta_{Vt}$ is the angle of the terminal voltage in the system,
Xcnv is the converter impedance, and
Xthev is the Thevenin equivalent impedance.

Accordingly, the converter gating logic of FIG. 10 is configured to create a converter voltage with an angle based upon the control signal $\theta_{Pang}$ and $\theta_{PLL}$. In other embodiments, the voltage with angle based on $\theta_{Pang}$ and $\theta_{PLL}$ may be created by other equipment capability of creating a voltage phasor. In particular embodiments, for example, the phase-locked loop 305 measures the angle $\theta_{PLL}$, which in steady-state is equal to the angle $\theta_{Vt}$ of the voltage Vt in the system. In such embodiments, these values are with respect to the system reference angle. During transients, an error signal $\theta_{PLLerr}$ is generated in this measurement as shown in FIG. 11.

Therefore, the following relationships exist with respect to the control angle signals:

$$\theta_{Vcnv} = \theta_{Pang} + \theta_{PLL} \quad \text{Equation (4)}$$

$$\theta_{PLL} = \theta_{Vt} - \theta_{PLLerr} \quad \text{Equation (5)}$$

$$\theta_{Vcnv} = \theta_{Pang} + \theta_{Vt} - \theta_{PLLerr} \quad \text{Equation (6)}$$

$$(\theta_{Vcnv} - \theta_{Vt}) = \theta_{Pang} - \theta_{PLLerr} \quad \text{Equation (7)}$$

$$P = Vcnv * Vt * \sin(\theta_{Pang} - \theta_{PLLerr})/(Xcnv) \quad \text{Equation (8)}$$

Moreover, the angle of the phase-locked loop 305 is the integral of the PLL frequency $\omega_{PLL}$, as shown in Equation (9) below:

$$\theta_{PLL}=1/s[\omega_{PLL}] \quad \text{Equation (9)}$$

In addition, the power angle from the power regulator is the integral of the power regulator frequency less the PLL frequency $\omega_{PLL}$, as shown in Equations (10)-(11) below:

$$\theta_{Pang}=1/s[\omega_{Preg}-\omega_{PLL}] \quad \text{Equation (10)}$$

$$\theta_{Pang}=1/s[\omega_{Preg}]-\theta_{PLL} \quad \text{Equation (11)}$$

The angle of the converter voltage relative to the system reference is equal to integral of the power regulator frequency signal $\omega_{Preg}$ and is independent of the PLL error, as shown in Equation (12) below:

$$\theta_{Vcnv}=1/s[\omega_{Preg}] \quad \text{Equation (12)}$$

Accordingly, and referring back to FIG. 10, to minimize latency to variations in the power command, the system 300 is configured to calculate two feedforward angles (i.e. $\theta_{Pangff}$ and $\theta_{PLLff}$), as shown at 314 and 316 in the feedforward path 302, respectively. Thus, as shown at 310 and 312, the feedforward angles $\theta_{Pangff}$ and $\theta_{PLLff}$ (e.g. in radians) can be differentiated to obtain an angle rate of change in frequency (e.g. $\omega_{Pangff}$ and $\omega_{PLLff}$ with units of radians/second). Further, as shown at 306 and 308, the angle rates of change can then be summed with frequency signals (e.g. $\omega_{Pref}$ and $\omega_{PLL}$). The outputs of these summations can then be integrated to obtain the final angles (i.e. $\theta_{Pang}$ and $\theta_{PLL}$) of the converter and the PLL.

In particular embodiments, the feedforward angles can be calculated by inverting the relationships defined in Equations (9)-(11) to determine the angles needed to achieve the desired power, assuming the external equivalent is known. Thus, in such embodiments, the system 300 is configured to determine the feedforward power angle as a function of the control command(s) and the first electrical condition(s) of the inverter-based resource by multiplying the power command by the converter impedance to obtain a first product, multiplying a converter voltage command by the terminal voltage to obtain a second product, dividing the first product by the second product to obtain a quotient, and determining the arcsine of the quotient, as represented by Equation (13) below:

$$\theta_{Pangff}=P_{ffPang}(Pcmd,Xcnv,VcnvCmd,Vt)=\arcsin(Pcmd*Xcnv/(VcnvCmd*Vt)) \quad \text{Equation (13)}$$

In another embodiment, the system 300 is configured to determine the feedforward phase-locked loop angle relative to the point where the PLL voltage as a function of the control command(s) and the second electrical condition(s) of the inverter-based resource by multiplying the power command by the feedforward impedance to obtain a first product, multiplying the feedforward voltage by the terminal voltage to obtain a second product, dividing the first product by the second product to obtain a quotient, and determining the arcsine of the quotient, as represented in Equation (14) below:

$$\theta_{PLLff}=P_{ffPLL}(P_{cmd},X_{ThFF},V_{ThFF},V_t)=\arcsin(P_{cmd}*X_{ThFF}/(V_{thFF}*V_t)) \quad \text{Equation (14)}$$

In certain embodiments, the feedforward impedance $X_{thFF}$ may not be generally known. In such embodiments, the system 300 may be configured to estimate the feedforward impedance as a central or mid-point impedance value between a strongest system and a weak system. For example, in one embodiment, the feedforward impedance may be about 0.3 pu. In such embodiments, for stronger grids, the prediction may be an overshoot, whereas for weaker grids, the prediction may be an undershoot. Moreover, in an embodiment, the system 300 may be configured to dynamically estimate the feedforward voltage as a function of at least one of real power, reactive power, voltage, or the feedforward impedance. Alternatively, the system 300 may be configured to set the feedforward voltage as a fixed value. In still further embodiments, the Thevenin equivalent feedforward voltage $V_{ThFF}$ may be a constant value, such as about 1 pu. In additional embodiments, if desired, the system 300 may also use terminal P, Q, V combined with the assumption for $X_{thFF}$ to compute the effective value of $V_{thFF}$ dynamically. Accordingly, it should be understood that parameter values can be estimated using simulations of expected project applications. Thus, those skilled in the art can select appropriate filtering and settings to achieve a practical implementations that achieve a rapid response to control command variations.

Still referring to FIG. 10, in particular embodiments, the feedforward path 302 of the system 300 can then determine the power angle $\theta_{Pang}$ and the phase-locked loop angle $\theta_{PLL}$ as a function of the feedforward power angle $\theta_{Pangff}$ and the feedforward phase-locked loop angle $\theta_{PLLff}$, respectively. In particular, in certain embodiments, as shown, the feedforward path 302 can differentiate the feedforward power angle and the feedforward phase-locked loop angles, as shown at 310 and 312 respectively. Furthermore, as shown at 306 and 308, the feedforward path 302 may add the differentiated feedforward power angle and the differentiated feedforward phase-locked angle to the power angle and the phase-locked loop angle, respectively, to obtain the power angle $\theta_{Pang}$ and the phase-locked loop angle $\theta_{PLL}$ that can be used by the converter gating control.

In additional embodiments, as shown in FIG. 10, the improved power limit function 304 of the system 300 may also provide limits on the power angle across the converter reactance. Thus, such limits are configured to provide a restraint on the power to prevent excess overshoot while other regulators act to settle after a severe transient. For example, in certain embodiments, the upper and lower limits (e.g. $\theta_{PangMax}$ and $\theta_{PangMin}$) can be calculated by multiplying each of a maximum power command and a minimum power command by the converter impedance to obtain a maximum product and a minimum product, respectively, multiplying a converter voltage command by the terminal voltage to obtain a second product, dividing each of the maximum product and the minimum product by the second product, respectively, to obtain a maximum quotient and a minimum quotient, determining the arcsine of each of the maximum quotient and the minimum quotient, and adding a phase-locked loop error to the arcsine of the maximum quotient and the arsine of the minimum quotient, as represented in Equations (15) and (16) below:

$$\theta_{PangMax}=\arcsin(P_{cmdMax}*X_{cnv}/(V_{cnvCmd}*V_t))+\theta_{PLLff} \quad \text{Equation (15)}$$

$$\theta_{PangMin}=\arcsin(P_{cmdMin}*X_{cnv}/(V_{cnvCmd}*V_t))+\theta_{PLLff} \quad \text{Equation (16)}$$

Further aspects of the invention are provided by the subject matter of the following clauses:

Clause 1. A method for providing grid-forming control of an inverter-based resource, the method comprising:

receiving, via a controller, one or more reference commands from an external controller;

determining, via the controller, one or more control commands for the inverter-based resource based on the one or more reference commands;

determining, via the controller, at least one feedforward signal as a function of the one or more control commands, one or more control signals, and one or more estimated electrical conditions of the inverter-based resource; and, using the at least one feedforward signal to position at least one control angle of the inverter-based resource to an anticipated value needed to achieve the one or more reference commands, thereby enabling rapid response to the one or more reference commands received from the external controller.

Clause 2. The method of clause 1, wherein the feedforward signal comprises at least one of an angle or an angle rate of change.

Clause 3. The method of any of the preceding clauses, wherein determining the at least one feedforward signal further comprises:

determining, via the controller, a feedforward power angle as a function of the one or more control commands, the one or more control signals, and one or more first electrical conditions of the inverter-based resource; and, determining, via the controller, a feedforward phase-locked loop angle for a phase-locked loop of the controller as a function of the one or more control commands, the one or more control signals, and one or more second electrical conditions of the inverter-based resource.

Clause 4. The method of clause 3, wherein the one or more first electrical conditions of the inverter-based resource further comprise at least one of a converter impedance or a terminal voltage, and wherein the one or more second electrical conditions of the inverter-based resource further comprise at least one of a terminal voltage, a feedforward impedance, or a feedforward voltage.

Clause 5. The method of clause 3, wherein using the at least one feedforward signal to position the at least one control angle of the inverter-based resource to the anticipated value needed to achieve the one or more reference commands further comprises:

determining, via the controller, a power angle rate of change and a phase-locked loop angle rate of change as a function of the feedforward power angle and the feedforward phase-locked loop angle, respectively.

Clause 6. The method of clause 5, wherein determining the power angle rate of change and the phase-locked loop angle rate of change as a function of the feedforward power angle and the feedforward phase-locked loop angle, respectively, further comprises:

adding a feedforward power angle rate of change and a feedforward phase-locked angle rate of change to a power regulator frequency and a phase-locked loop frequency, respectively.

Clause 7. The method of clause 4, wherein the one or more reference commands comprises at least one of a power reference or one or more power command limits from the external controller, and wherein the one or more control commands comprises a power command.

Clause 8. The method of clause 7, wherein determining the feedforward power angle as a function of the one or more control commands, the one or more control signals, and the one or more first electrical conditions of the inverter-based resource further comprises:

multiplying the power command by the converter impedance to obtain a first product;

multiplying a converter voltage command by the terminal voltage to obtain a second product;

dividing the first product by the second product to obtain a quotient; and determining the arcsine of the quotient.

Clause 9. The method of clause 8, wherein determining the feedforward phase-locked loop angle for the phase-locked loop of the controller as a function of the one or more control commands, the one or more control signals, and the one or more second electrical conditions of the inverter-based resource further comprises:

multiplying the power command by the feedforward impedance to obtain a first product;

multiplying the feedforward voltage by the terminal voltage to obtain a second product;

dividing the first product by the second product to obtain a quotient; and determining the arcsine of the quotient.

Clause 10. The method of clauses 9, further comprising estimating the feedforward impedance as a central impedance value between a strongest system and a weak system.

Clause 11. The method of clauses 9-10, further comprising dynamically estimating the feedforward voltage as a function of at least one of real power, reactive power, voltage, or the feedforward impedance.

Clause 12. The method of clauses 9-11, further comprising setting the feedforward voltage as a fixed value.

Clause 13. The method of clause 5, wherein using the at least one feedforward signal to position the at least one control angle of the inverter-based resource to the anticipated value needed to achieve the one or more reference commands further comprises:

determining upper and lower power angle limits for the at least one control angle; and applying the upper and lower power angle limits to the power angle to provide a constraint on power while one or more other regulators of the inverter-based resource act to settle after a transient event.

Clause 14. The method of clause 13, wherein determining the upper and lower power angle limits for the at least one control angle further comprises:

multiplying each of a maximum power command and a minimum power command by the converter impedance to obtain a maximum product and a minimum product, respectively;

multiplying a converter voltage command by the terminal voltage to obtain a second product;

dividing each of the maximum product and the minimum product by the second product, respectively, to obtain a maximum quotient and a minimum quotient;

determining the arcsine of each of the maximum quotient and the minimum quotient; and adding a phase-locked loop error to the arcsine of the maximum quotient and the arsine of the minimum quotient.

Clause 15. A converter controller for providing grid-forming control of an inverter-based resource, the converter controller comprising:

at least one controller comprising at least one processor, the at least one processor configured to perform a plurality of operations, the plurality of operations comprising:

receiving one or more control commands;

determining at least one feedforward signal as a function of the one or more control commands, one or more control signals, and one or more estimated electrical conditions of the inverter-based resource; and, using the at least one feedforward signal to position at least one control angle of the inverter-based resource to an anticipated value needed to achieve the one or more reference commands, thereby enabling rapid response to the one or more reference commands received from the external controller.

Clause 16. The converter controller of clause 15, wherein the feedforward signal comprises at least one of an angle or angle rate of change.

Clause 17. The converter controller of clauses 15-16, wherein determining the at least one feedforward signal as a function of the one or more control commands, the one or more control signals, and one or more electrical conditions of the inverter-based resource further comprises:

determining, via the converter controller, a feedforward power angle as a function of the one or more control commands and one or more first electrical conditions of the inverter-based resource; and, determining, via the converter controller, a feedforward phase-locked loop angle for a phase-locked loop of the converter controller as a function of the one or more control commands and one or more second electrical conditions of the inverter-based resource.

Clause 18. The converter controller of clause 17, wherein using the at least one feedforward signal to position the at least one control angle of the inverter-based resource to the anticipated value needed to achieve the one or more reference commands further comprises:

determining, via the converter controller, a power angle and a phase-locked loop angle as a function of the feedforward power angle and the feedforward phase-locked loop angle, respectively.

Clause 19. The converter controller of clause 18, wherein using the at least one feedforward signal to position the at least one control angle of the inverter-based resource to the anticipated value needed to achieve the one or more reference commands further comprises:

determining upper and lower power angle limits for the at least one control angle; and applying the upper and lower power angle limits to the power angle to provide a constraint on power while one or more other regulators of the inverter-based resource act to settle after a transient event.

Clause 20. The converter controller of clause 19, wherein determining the upper and lower power angle limits for the at least one control angle further comprises:

multiplying each of a maximum power command and a minimum power command by the converter impedance to obtain a maximum product and a minimum product, respectively;

multiplying a converter voltage command by the terminal voltage to obtain a second product;

dividing each of the maximum product and the minimum product by the second product, respectively, to obtain a maximum quotient and a minimum quotient;

determining the arcsine of each of the maximum quotient and the minimum quotient; and adding a phase-locked loop error to the arcsine of the maximum quotient and the arsine of the minimum quotient.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for providing grid-forming control of an inverter-based resource, the method comprising:

receiving, via a controller, one or more reference commands from an external controller and one or more estimated electrical conditions of the inverter-based resource;

determining, via the controller, one or more control commands for the inverter-based resource based on the one or more reference commands;

determining, via the controller, at least one feedforward signal as a function of the one or more control commands, one or more control signals, and one or more estimated electrical conditions of the inverter-based resource; and, using the at least one feedforward signal to position at least one control angle of the inverter-based resource to an anticipated angle value needed to achieve the one or more reference commands, thereby enabling rapid response to the one or more reference commands received from the external controller, wherein the at least one control angle includes an upper power angle limit and a lower power angle limit.

2. The method of claim 1, wherein the feedforward signal comprises at least one of an angle or an angle rate of change.

3. The method of claim 1, wherein determining the at least one feedforward signal further comprises:

determining, via the controller, a feedforward power angle as a function of the one or more control commands, the one or more control signals, and one or more first electrical conditions of the inverter-based resource; and, determining, via the controller, a feedforward phase-locked loop angle for a phase-locked loop of the controller as a function of the one or more control commands, the one or more control signals, and one or more second electrical conditions of the inverter-based resource.

4. The method of claim 3, wherein the one or more first electrical conditions of the inverter-based resource further comprise at least one of a converter impedance or a terminal voltage, and wherein the one or more second electrical conditions of the inverter-based resource further comprise at least one of a terminal voltage, a feedforward impedance, or a feedforward voltage.

5. The method of claim 4, wherein the one or more reference commands comprises at least one of a power reference or one or more power command limits from the external controller, and wherein the one or more control commands comprises a power command.

6. The method of claim 5, wherein determining the feedforward power angle as a function of the one or more control commands, the one or more control signals, and the one or more first electrical conditions of the inverter-based resource further comprises the controller:

multiplying the power command by the converter impedance to obtain a first value;

multiplying a converter voltage command by the terminal voltage to obtain a second value;

dividing the first value by the second value to obtain a quotient value; and determining the arcsine of the quotient value.

7. The method of claim 6, wherein determining the feedforward phase-locked loop angle for the phase-locked loop of the controller as a function of the one or more control commands, the one or more control signals, and the one or more second electrical conditions of the inverter-based resource further comprises:

multiplying the power command by the feedforward impedance to obtain a first value;

multiplying the feedforward voltage by the terminal voltage to obtain a second value;

dividing the first value by the second value to obtain a quotient value; and determining the arcsine of the quotient value.

8. The method of claim 7, further comprising estimating the feedforward impedance as a central impedance value between a strongest system and a weak system.

9. The method of claim 7, further comprising dynamically estimating the feedforward voltage as a function of at least one of real power, reactive power, voltage, or the feedforward impedance.

10. The method of claim 7, further comprising setting the feedforward voltage as a fixed value.

11. The method of claim 3, wherein using the at least one feedforward signal to position the at least one control angle of the inverter-based resource to the anticipated angle value needed to achieve the one or more reference commands further comprises:
determining, via the controller, a power angle rate of change and a phase-locked loop angle rate of change as a function of the feedforward power angle and the feedforward phase-locked loop angle, respectively.

12. The method of claim 11, wherein determining the power angle rate of change and the phase-locked loop angle rate of change as a function of the feedforward power angle and the feedforward phase-locked loop angle, respectively, further comprises:
adding a feedforward power angle rate of change and a feedforward phase-locked angle rate of change to a power regulator frequency and a phase-locked loop frequency, respectively.

13. The method of claim 11, wherein using the at least one feedforward signal to position the at least one control angle of the inverter-based resource to the anticipated angle value needed to achieve the one or more reference commands further comprises:
applying the upper and lower power angle limits to the power angle to provide a constraint on power while one or more other regulators of the inverter-based resource act to settle after a transient event.

14. The method of claim 1, wherein determining the upper and lower power angle limits for the at least one control angle further comprises:
multiplying each of a maximum power command and a minimum power command by a converter impedance to obtain a maximum product and a minimum product, respectively;
multiplying a converter voltage command by a terminal voltage to obtain a second value;
dividing each of the maximum product and the minimum product by the second value, respectively, to obtain a maximum quotient value and a minimum quotient value;
determining an arcsine of each of the maximum quotient value and the minimum quotient value; and
adding a phase-locked loop error to the arcsine of the maximum quotient value and the arcsine of the minimum quotient value.

15. The converter controller of claim 1, wherein determining the upper and lower power angle limits for the at least one control angle further comprises:
multiplying each of a maximum power command and a minimum power command by a converter impedance to obtain a maximum product and a minimum product, respectively;
multiplying a converter voltage command by a terminal voltage to obtain a second value;
dividing each of the maximum product and the minimum product by the second value, respectively, to obtain a maximum quotient value and a minimum quotient value;
determining an arcsine of each of the maximum quotient value and the minimum quotient value; and
adding a phase-locked loop error to the arcsine of the maximum quotient value and the arcsine of the minimum quotient value.

16. A converter controller for providing grid-forming control of an inverter-based resource, the converter controller comprising:
at least one controller comprising at least one processor, the at least one processor configured to perform a plurality of operations, the plurality of operations comprising:
receiving one or more control commands;
determining at least one feedforward signal as a function of the one or more control commands, one or more control signals, and one or more estimated electrical conditions of the inverter-based resource; and,
using the at least one feedforward signal to position at least one control angle of the inverter-based resource to an anticipated angle value needed to achieve the one or more reference commands, thereby enabling rapid response to the one or more reference commands received from the external controller, wherein the at least one control angle includes an upper power angle limit and a lower power angle limit.

17. The converter controller of claim 16, wherein the feedforward signal comprises at least one of an angle or angle rate of change.

18. The converter controller of claim 16, wherein determining the at least one feedforward signal as a function of the one or more control commands, the one or more control signals, and one or more electrical conditions of the inverter-based resource further comprises:
determining, via the converter controller, a feedforward power angle as a function of the one or more control commands and one or more first electrical conditions of the inverter-based resource; and,
determining, via the converter controller, a feedforward phase-locked loop angle for a phase-locked loop of the converter controller as a function of the one or more control commands and one or more second electrical conditions of the inverter-based resource.

19. The converter controller of claim 18, wherein using the at least one feedforward signal to position the at least one control angle of the inverter-based resource to the anticipated angle value needed to achieve the one or more reference commands further comprises:
determining, via the converter controller, a power angle and a phase-locked loop angle as a function of the feedforward power angle and the feedforward phase-locked loop angle, respectively.

20. The converter controller of claim 19, wherein using the at least one feedforward signal to position the at least one control angle of the inverter-based resource to the anticipated angle value needed to achieve the one or more reference commands further comprises:
applying the upper and lower power angle limits to the power angle to provide a constraint on power while one or more other regulators of the inverter-based resource act to settle after a transient event.

* * * * *